(12) United States Patent
Takahashi et al.

(10) Patent No.: US 8,552,904 B2
(45) Date of Patent: Oct. 8, 2013

(54) IN-VEHICLE PULSE RADAR

(75) Inventors: Kei Takahashi, Tokyo (JP); Sadao Matushima, Tokyo (JP); Toshihide Fukuchi, Tokyo (JP)

(73) Assignees: Furukawa Electric Co., Ltd., Tokyo (JP); Furukawa Automotive Systems Inc., Inukami-gun (JP)

( * ) Notice: Subject to any disclaimer, the term of this patent is extended or adjusted under 35 U.S.C. 154(b) by 0 days.

(21) Appl. No.: 13/611,138

(22) Filed: Sep. 12, 2012

(65) Prior Publication Data

US 2013/0002471 A1  Jan. 3, 2013

Related U.S. Application Data

(63) Continuation of application No. PCT/JP2011/055387, filed on Mar. 8, 2011.

(30) Foreign Application Priority Data

Mar. 30, 2010  (JP) .................................. 2010-078523

(51) Int. Cl.
*G01S 13/00* (2006.01)

(52) U.S. Cl.
USPC ................ 342/70; 342/85; 342/107; 342/118

(58) Field of Classification Search
USPC ....................... 342/70, 85, 107, 118, 133–134
See application file for complete search history.

(56) References Cited

U.S. PATENT DOCUMENTS

| | | | | |
|---|---|---|---|---|
| 5,229,774 | A | * | 7/1993 | Komatsu ........................ 342/70 |
| 5,973,636 | A | * | 10/1999 | Okubo et al. ................... 342/70 |
| 6,614,389 | B2 | * | 9/2003 | Suzuki et al. ................... 342/70 |
| 6,795,013 | B2 | * | 9/2004 | Suzuki et al. ................... 342/70 |
| 7,030,807 | B2 | * | 4/2006 | Yokoo et al. .................. 342/135 |
| 7,205,929 | B2 | * | 4/2007 | Shingyoji et al. .............. 342/70 |

(Continued)

FOREIGN PATENT DOCUMENTS

| | | |
|---|---|---|
| JP | 61-193384 | 12/1986 |
| JP | 10-261917 | 9/1998 |

(Continued)

OTHER PUBLICATIONS

International Search Report issued Apr. 12, 2011, in PCT/JP2011/055387 filed Mar. 8, 2011 (with English-language translation).

*Primary Examiner* — John B Sotomayor
*Assistant Examiner* — Marcus Windrich
(74) *Attorney, Agent, or Firm* — Oblon, Spivak, McClelland, Maier & Neustadt, L.L.P.

(57) ABSTRACT

There is provided an in-vehicle pulse radar that permits to detect information on an object accurately by temporally separating a noise signal mixed into a receiving signal by applying a delay time with a simple configuration. A baseband signal down-converted by a frequency converter (152) is output to a signal processing section (102) through a board-to-board connector (103) after passing through a delay circuit (153). Still further, a control signal is output to a switching circuit (151) from a control signal generating section (162) through the board-to-board connector (103). The delay circuit (153) increases a time lag from when the control signal passes through the board-to-board connector (103) until when the baseband signal passes through the board-to-board connector (103) by applying a predetermined delay time to the baseband signal. Thereby, the baseband signal receives no interference from the control signal.

7 Claims, 2 Drawing Sheets

(56) References Cited

U.S. PATENT DOCUMENTS

| | | | |
|---|---|---|---|
| 7,443,336 B2 * | 10/2008 | Noda | 342/135 |
| 8,044,845 B2 * | 10/2011 | Saunders | 342/175 |
| 2004/0036646 A1 * | 2/2004 | Suzuki et al. | 342/70 |
| 2005/0225481 A1 * | 10/2005 | Bonthron | 342/175 |
| 2006/0012511 A1 * | 1/2006 | Dooi et al. | 342/70 |
| 2007/0013576 A1 * | 1/2007 | Shingyoji et al. | 342/70 |
| 2009/0121916 A1 * | 5/2009 | Miyake | 342/70 |

FOREIGN PATENT DOCUMENTS

| | | |
|---|---|---|
| JP | 2921489 | 7/1999 |
| JP | 2006-99971 | 4/2006 |
| JP | 2008-175622 | 7/2008 |

\* cited by examiner

IN-VEHICLE PULSE RADAR

TECHNICAL FIELD

The present invention relates to a pulse radar apparatus mounted in a vehicle and more specifically to an in-vehicle pulse radar that permits to detect information on an object accurately by temporally separating a noise signal generated within the apparatus.

BACKGROUND ART

A conventional pulse radar apparatus comprises a transmitting section configured to generate a pulsed transmission signal formed of a high-frequency carrier wave, a transmitting antenna configured to emit the transmission signal generated by the transmitting section to the air as radio wave, a receiving antenna configured to receive reflected wave of the radio wave emitted from the transmitting antenna and returned by being reflected by an object, a receiving section configured to down-convert the received signal received from the receiving antenna to a baseband signal, and a signal processing section configured to input the baseband signal from the receiving section to calculate a distance to the object and others. The signal processing section is provided with a control section configured to output control signals for controlling the transmitting and receiving sections.

Because the transmitting and receiving sections and the transmitting and receiving antennas among the components of the pulse radar described above process high-frequency transmitting and received signals, they are disposed on a high-frequency printed circuit board suitable for transmitting the high-frequency signals. In contrary to that, because the signal processing section processes the baseband signal down-converted by the receiving section and the control section provided in the signal processing section also outputs relatively low frequency control signals to the transmitting and receiving sections, they are normally disposed on a low-frequency printed circuit board.

As described above, the pulse radar uses at least two printed circuit boards of the high-frequency printed circuit board and the low-frequency printed circuit board. Then, a signal transmitting means for transmitting the signals between the respective printed circuit boards is required. Conventionally, an inexpensive and general-purpose multi-pin board-to-board connector is widely used as the signal transmitting means for transmitting the signals between printed circuit boards.

Lately, a need to mount a pulse radar in a vehicle is increasing in order to prevent collision of the vehicle and to support parking of the vehicle. Then, an in-vehicle pulse radar is used to detect information on an object existing in front of or around the vehicle. Because downsizing and cutting costs of a radar apparatus are strongly demanded for such in-vehicle pulse radar, printed circuit boards and a board-to-board connector for connecting the printed circuit boards used in the in-vehicle pulse radar are also required to downsize and to lower costs.

The downsized multi-pin board-to-board connector has a problem that it is liable to cause interferences due to electromagnetic coupling between terminals (pins) because a pitch between the terminals is narrow and high-frequency and broadband signals are transmitted more. If such interference between the terminals occurs, a control signal that propagates through a terminal leaks into a receiving signal propagating through another predetermined terminal as a noise signal. Then, it causes a problem that it is unable to detect the information on the object from the receiving signal if the noise signal leaks into the receiving signal in the multi-pin board-to-board connector as described above.

There have been known means for preventing the leak of the noise signal in the board-to-board connector as described above since the past. Patent Document 1 discloses that enhancing isolation of the board-to-board connector itself and reducing intensity of the noise signal leaking between the terminals by using a board-to-board connector having ferrite. Patent Document 2 discloses that enhancing isolation of terminals of the board-to-board connector and reducing intensity of the noise signal leaking between the terminals by disposing grounding terminals between the terminals. Still further, it is possible to improve the isolation between the terminals of the board-to-board connector and to reduce the intensity of the control signal leaking into the receiving signal as the noise signal by disposing the terminal for transmitting the control signal and the grounding terminal in zigzag.

PRIOR ART DOCUMENT

Patent Document

Patent Document 1: Japanese Patent Application Laid-open No. 2006-099971
Patent Document 2: Japanese Patent No. 2921489

SUMMARY OF THE INVENTION

Problem to be Solved by the Invention

However, the both means described above still have problems that the structure of the board-to-board connector is complicated, increasing size and costs thereof.

The present invention was made to solve the problems described above, and has an object of providing an in-vehicle pulse radar that permits to detect information on an object accurately by temporally separating a noise signal mixed into a receiving signal by applying a delay time with a simple configuration.

Means for Solving the Problems

In order to solve the abovementioned problems, according to a first aspect of the invention, an in-vehicle pulse radar comprises at least two printed circuit boards of a first printed circuit board for high frequency and a second printed circuit board for low frequency, and a predetermined signal transmitting means connecting the two printed circuit boards.

The first printed circuit board has a local oscillator that outputs a local oscillation signal, a transmitting section configured to output a transmission signal by modulating the local oscillation signal inputted from the local oscillator, an antenna configured to input the transmission signal from the transmitting section to emit to the air as radio wave and to receive reflected waves of the radio wave reflected by an object, a receiving section having a time division section that performs time division on the receiving signal received from the antenna in synchronism with a measured distance, a frequency converter that converts frequency of the receiving signal into the baseband signal, and a delay circuit that outputs the baseband signal by applying a predetermined delay time to the baseband signal.

The second printed circuit board has a signal processing section including an object information calculating section that inputs the baseband signal from the receiving section via the signal transmitting means to calculate information on the object, and a control signal generating section that outputs a control signal for driving the time division section to the time division section via the signal transmitting means.

The delay circuit applies the delay time to the baseband signal so that the baseband signal inputted from the frequency converter passes through the signal transmitting means by being delayed by a predetermined time from the control signal.

According to another aspect of the in-vehicle pulse radar of the invention, the receiving section has another delay circuit that outputs the control signal to the time division section by applying a predetermined delay time to the control signal inputted from the control signal generating section via the signal transmitting means.

According to a still other aspect of the in-vehicle pulse radar of the invention, the delay time is adjusted to make a time lag so that a time slot in which the control signal passes through the signal transmitting means does not substantially overlap with a time slot in which the baseband signal passes through the signal transmitting means.

According to a different aspect of the in-vehicle pulse radar of the invention, the delay circuit is composed of a low-pass filter.

According to a still different aspect of the in-vehicle pulse radar of the invention, the time division section is a switching circuit that passes the receiving signal only during a predetermined duration in synchronism with a measured distance of the object.

According to another aspect of the in-vehicle pulse radar of the invention, the signal transmitting means is a board-to-board connector.

Effects of the Invention

The invention can provide the in-vehicle pulse radar that permits to detect the information on the object accurately by temporally separating the noise signal mixed into the receiving signal by applying the delay time with the simple configuration.

DESCRIPTION OF EMBODIMENTS

Figure 1:
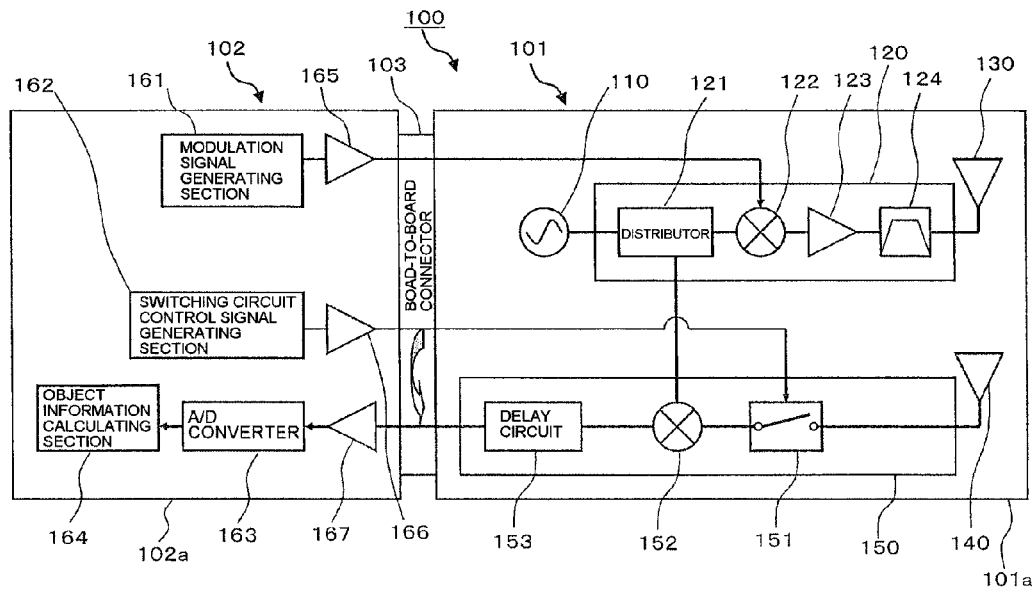
FIG. 1 is a block diagram showing a configuration of an in-vehicle pulse radar according to a first embodiment of the invention.

Preferred embodiments of an in-vehicle pulse radar of the invention will be explained in detail below with reference to the drawings. It is noted that each component having the same or corresponding function will be described by denoting the same reference numeral to simplify the illustration and explanation thereof.

(First Embodiment)

The in-vehicle pulse radar of the first embodiment of the invention will be explained below with reference to FIG. 1. FIG. 1 is a block diagram showing a configuration of the in-vehicle pulse radar 100 of the present embodiment. The in-vehicle pulse radar 100 comprises a high-frequency circuit section 101 and a signal processing section 102 respectively disposed on two printed circuit boards of first and second printed circuit boards 101a and 102a. The in-vehicle pulse radar 100 is also provided with a board-to-board connector 103 configured to connect the first and second printed circuit boards 101a and 102a as a signal transmitting means for transmitting signals between the high-frequency circuit section 101 and the signal processing section 102.

It is noted that although the in-vehicle pulse radar 100 is composed of the two printed circuit boards of the first and second printed circuit boards 101a and 102a in the following explanation, the in-vehicle pulse radar of the invention is not limited to what is composed of two printed circuit boards and is applicable also to an in-vehicle pulse radar composed of three or more printed circuit boards.

The high-frequency circuit section 101 mounted on the first printed circuit board 101a includes a local oscillator 110 that outputs a local oscillation signal, a transmitting section 120 configured to output a transmission signal by inputting the local oscillation signal from the local oscillator 110, a transmitting antenna 130 configured to input the transmission signal from the transmitting section 120 to emit to the air as radio wave, a receiving antenna 140 configured to receive reflected wave of the radio wave emitted to the air and returned by being reflected by an object, and a receiving section 150 configured to process a receiving signal received from the receiving antenna 140. The receiving section 150 outputs a baseband signal to the signal processing section 102 through the board-to-board connector 103.

The transmitting section 120 has a signal distributor 121, a signal modifying section 122, an amplifier 123 and a band-pass filter 124. The signal distributor 121 inputs the local oscillation signal from the local oscillator 110 and distributes to the signal modifying section 122 and the receiving section 150. The signal modifying section 122 modulates the local oscillation signal inputted from the signal distributor 121 by using a predetermined modulation signal to output a pulsed transmission signal. The modulation signal used for the modulation of the local oscillation signal is inputted from the signal processing section 102. The amplifier 123 amplifies signal level of the transmission signal modulated by the signal modifying section 122 to a predetermined level. The band-pass filter 124 limits frequency band of the signal output from the amplifier 123 and outputs only the transmission signal of a predetermined frequency band from the transmitting section 120.

The receiving section 150 has a time division section 151 that performs time division on the receiving signal in synchronism with a measured distance, a frequency converter 152 that converts frequency of the receiving signal, and a delay circuit 153. The time division section 151 performs the time division on the receiving signal received from the receiving antenna 140 in synchronism with the measured distance and cuts out and outputs only receiving signal corresponding to the measured distance. A switching circuit is used as the time division section 151 in FIG. 1 (referred to as the switching circuit 151 hereinafter). The frequency converter 152 converts the frequency of the receiving signal by the local oscillation signal input from the local oscillator 110 through the signal distributor 121. Thereby, the receiving signal is down-converted into a baseband signal. In FIG. 1, a mixer is used as the frequency converter 152.

The baseband signal down-converted by the frequency converter 152 is not output to the signal processing section 102 as it is, but is output to the signal processing section 102 after passing through the delay circuit 153 in the receiving section 150 of the present embodiment. The delay circuit 153 outputs the baseband signal input from the frequency converter 152 by applying a predetermined delay time. Then, the baseband signal delayed by the delay circuit 153 is output to the signal processing section 102 through the board-to-board connector 103.

The signal processing section 102 mounted on the second printed circuit board 102*a* includes a modulation signal generating section 161 configured to output a modulation signal for modulating the local oscillation signal generated by the local oscillator 110 to the signal modifying section 122, a control signal generating section 162 that outputs a control signal for controlling drive (opening/closing) of the switching circuit 151, an A/D converter 163 that converts the baseband signal input from the receiving section 150 through the board-to-board connector 103 into a digital signal, and an object information calculating section 164 that inputs the digital signal from the A/D converter 163 to calculate information such as position of the object, relative speed and others. Amplifiers 165 through 167 are also provided as necessary.

Because the in-vehicle pulse radar is strongly demanded to be downsized and its cost to be cut, the first and second printed circuit boards 101*a* and 102*a* of the in-vehicle pulse radar 100 of the present embodiment are also required to be downsized. Due to that, the downsized and general-purpose connector in which a terminal-to-terminal distance is narrowed is required to use as the board-to-board connector 103 that connects between the printed circuit boards. Still further, the high-frequency (GHz frequency band) and broadband signals are used in the in-vehicle pulse radar 100 as transmitting and receiving signals to enhance performance and quality. Accordingly, electromagnetic coupling is liable to occur between the terminals of the board-to-board connector 103 whose terminal-to-terminal distance is narrowed, and when the baseband signal passes through the board-to-board connector 103, a noise signal leaks in the baseband signal by being influenced by the control signal propagating through other terminals.

Then, the in-vehicle pulse radar 100 of the present embodiment is arranged so as to be able to obtain low-noise preferable baseband signal by separating the baseband signal from the noise signal even if the electromagnetic coupling occurs between the terminals of the board-to-board connector 103 whose terminal pitch is narrowed.

While the receiving section 150 is provided with the switching circuit 151 for performing the time division on the receiving signal received from the receiving antenna 140 in synchronism with the measured distance, a control signal for controlling the opening/closing of the switching circuit 151 is transmitted to the switching circuit 151 from the control signal generating section 162 through the board-to-board connector 103. A time lag from when this control signal passes through the board-to-board connector 103 until when the switching circuit 151 becomes operative and the baseband signal passes through the board-to-board connector 103 is extremely small, and the control signal and the baseband signal pass through the board-to-board connector 103 almost in the same time. Due to that, the electromagnetic coupling between the terminals causes interference between the baseband signal and the control signal, and the noise signal is mixed into the baseband signal.

Then, the in-vehicle pulse radar 100 of the present embodiment is arranged so that the time lag from when the control signal from the control signal generating section 162 passes through the board-to-board connector 103 until when the baseband signal passes through the board-to-board connector 103 increases by providing the delay circuit 153 within the receiving section 150. The delay circuit 153 applies a predetermined delay time to the baseband signal so that timing when the baseband signal passes through the board-to-board connector 103 is delayed. This arrangement permits the control signal to have finished to pass through the board-to-board connector 103 at the time when the baseband signal passes through the board-to-board connector 103. As a result, it is possible to prevent the baseband signal from being interfered from the control signal.

As the delay circuit 153, a low-pass filter (LPF) is used in the present embodiment. The use of the LPF permits to obtain an effect of delaying a predetermined low-frequency signal by a predetermined time in passing through the board-to-board connector 103. Still further, the use of the LPF permits to save a space by reducing a required installation area and to realize the broadband delay circuit 153 that does not affect frequency characteristics of the baseband signal.

Figure 2:
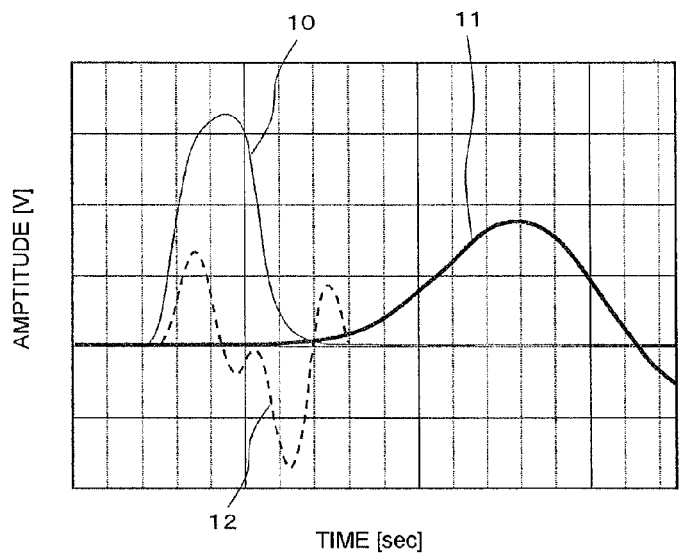
FIG. 2 is a temporal waveform chart of a baseband signal and a noise signal passing through a board-to-board connector.

FIG. 2 shows one exemplary temporal waveform when the baseband signal passes through the board-to-board connector 103 after passing through the delay circuit 153 composed of the LPF. FIG. 2 shows the baseband signal 11 that has passed through the delay circuit 153. Still further, for the purpose of comparison, FIG. 2 shows a baseband signal 10 that passes through the board-to-board connector 103 without passing through the delay circuit 153 from the frequency converter 152. FIG. 2 also shows a noise signal 12 that is mixed into the terminal through which the baseband signal passes by the electromagnetic coupling with the terminal through which the control signal transmitted from the control signal generating section 162 to the switching circuit 151 passes in the board-to-board connector 103.

It can be seen from FIG. 2 that timing when the baseband signal 10 that does not pass through the delay circuit 153 passes through the board-to-board connector 103 is almost the same time with timing when the noise signal 12 is mixed in. As a result, the noise signal 12 mixes into the baseband signal 10 that does not passes through the delay circuit 153. In contrary, timing when the baseband signal 11 that has passed through the delay circuit 153 and is delayed passes through the board-to-board connector 103 is delayed by a time T from the baseband signal 10. As a result, there is already no noise signal 12 that mixes in at the timing when the baseband signal 11 pass through the board-to-board connector 103, and the baseband signal 11 will not be affected by the noise signal 12.

It is possible to prevent the noise signal 12 from mixing into the baseband signal 11 inputted to the A/D converter 163 through the board-to-board connector 103 as shown in FIG. 2 by providing the delay circuit 153 composed of the LPF having the predetermined delay time between the frequency converter 152 and the board-to-board connector 103. The delay time T may be readily adjusted by a number of stages of the LPF in the delay circuit 153 using the LPF. That is, when a long delay time T is required, it can be realized by increasing the number of stages of the LPF.

Figure 3:
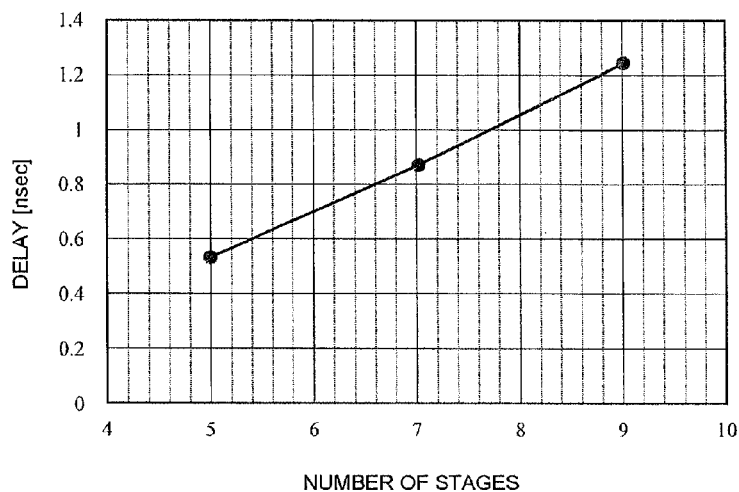
FIG. 3 is a chart showing a relationship between a number of stages of LPF and a delay time.

FIG. 3 shows a relationship between the number of stages of the LPF and the delay time. The number of stages of the LPF is represented by an axis of abscissa and the delay time [nsec] is represented by an axis of ordinate in the chart. Here, the delay time is indicated when the delay circuit 153 is configured by using the LPF whose cutoff frequency fc=1 GHz for example. It is possible to obtain a delay time in which the delay time corresponding to the number of stages of the LPF is added to a delay time obtained corresponding to the cutoff frequency of the LPF in the delay circuit 153. As shown in FIG. 3, the delay time extends substantially in proportion to the number of stages of the LPF, and it is possible to extend the delay time by about 0.7 nsec (700 psec) by increasing the number of stages of the LPF from five stages to nine stages for example. It is possible to increase the number of stages of the LPF as long as an installation space is assured in the delay circuit 153, so that the delay time can be readily adjusted.

The delay circuit 153 has a merit that it is also possible to substantially equalize a frequency band required for the LPF with the baseband band because the delay circuit 153 passes the signal down-converted to the frequency of the baseband band by the frequency converter 152. Thus, the present embodiment permits to realize the delay circuit 153 by the simple configuration and to provide the in-vehicle pulse radar 100 capable of detecting the information on the object accurately by temporally separating the noise signal otherwise mixed into the receiving signal by applying the desirable delay time to the baseband signal by using this configuration.

(Second Embodiment)

Figure 4:
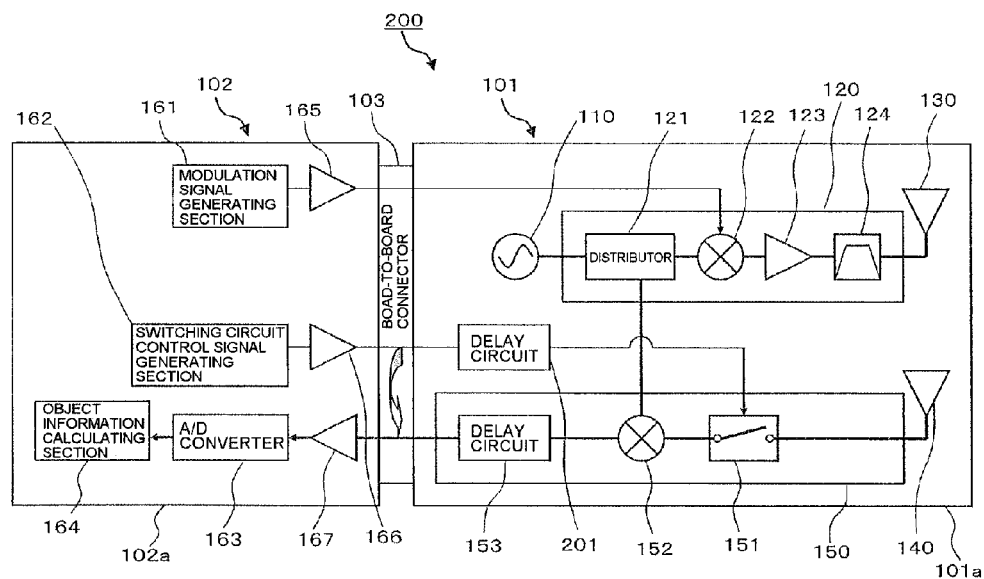
FIG. 4 is a block diagram showing a configuration of an in-vehicle pulse radar according to a second embodiment of the invention.

An in-vehicle pulse radar of a second embodiment of the invention will be explained below with reference to FIG. 4. FIG. 4 is a block diagram showing a configuration of the in-vehicle pulse radar 200 of the present embodiment. Another delay circuit 201 is provided also in a transmission line of the control signal output from the control signal generating section 162 to the switching circuit 151, in addition to the delay circuit 153 that applies the delay time to the baseband signal, in the in-vehicle pulse radar 200 of the present embodiment.

The delay circuit 201 is provided between the board-to-board connector 103 and the switching circuit 151 in the transmission line of the control signal from the control signal generating section 162 to the switching circuit 151. The delay circuit 201 can be configured by using the LPF in the same manner with the delay circuit 153.

The present embodiment permits to adjust the delay time of the timing of the baseband signal passing through the board-to-board connector 103 with respect to the timing of the control signal passing more flexibly by using the delay circuits 153 and 201. It is noted that it is necessary to use LPF that does not affect the frequency band of the control signal output to the switching circuit 151 as the delay circuit 201.

The in-vehicle pulse radar of the present invention permits to use the small, low-cost and general-purpose board-to-board connector as the signal transmitting means for transmitting signals between the high-frequency circuit section and the signal processing section. Even if such board-to-board connector is used to transmit high-frequency and broadband signals, it is possible to temporally separate the noise signal caused by the electromagnetic coupling between the terminals from the baseband signal, i.e., the receiving signal, and to provide the in-vehicle pulse radar capable of detecting the information on the object accurately. The delay circuit used in the invention delays by inputting the low-frequency band signal, so that it is possible to configure the delay circuit by using the LPF composed of general-purpose chip components (inductor and capacitor) and a pattern. This permits to provide the readily downsized and low-cost in-vehicle pulse radar.

An in-vehicle pulse radar of a still different embodiment of the invention will be explained below. According to the present embodiment, a distance between the frequency converter 152 and the board-to-board connector 103 is prolonged so that the timing when the baseband signal output from the frequency converter 152 passes through the board-to-board connector 103 is delayed by a predetermined time from that of the control signal output from the control signal generating section 162. As a means to prolong this distance, the transmission line between the frequency converter 152 and the board-to-board connector 103 is arranged to meander within the first printed circuit board 101a. Or, it is also possible to connect a chip delay line between the frequency converter 152 and the board-to-board connector 103.

It is possible to temporally separate the noise signal from the control signal mixed into the baseband signal in the board-to-board connector 103 and thereby to detect the information on the object accurately by delaying the timing of the baseband signal passing through the board-to-board connector 103 by using either one or more of the means described above.

It is noted that the description of the present embodiment illustrates just one exemplary radar apparatus of the invention and the invention is not limited to that. The detailed configuration and detailed operation of the radar apparatus of the present embodiment are appropriately modifiable within a scope not departing from the gist of the invention.

Description Of Reference Numerals 100, 200 In-vehicle pulse radar
101 High-frequency circuit section
101a First printed circuit board
102 Signal processing section
102a Second printed circuit board
103 Board-to-board connector
110 Local oscillator
120 Transmitting section
121 Signal distributor
122 Signal modifying section
123, 165, 166, 167 Amplifier
124 Band-pass filter
130 Transmitting antenna
140 Receiving antenna
150 Receiving section
151 Time division section
152 Frequency converter
153, 201 Delay circuit
161 Modulation signal generating section
162 Control signal generating section
163 A/D converter
164 Object information calculating section

The invention claimed is:

1. An in-vehicle pulse radar, comprising a first printed circuit board for high frequency and a second printed circuit board for low frequency, and a connector connecting the two printed circuit boards;

wherein the first printed circuit board includes:
   a local oscillator that outputs a local oscillation signal;
   a transmitting section configured to output a transmission signal by modulating the local oscillation signal inputted from the local oscillator;
   a transmitting antenna configured to receive the transmission signal from the transmitting section to emit to the air as radio wave;
   a receiving antenna configured to receive reflected waves of the radio wave reflected by an object; and
   a receiving section having a time division section that performs time division on a received signal received by the receiving antenna in synchronism with a measured distance, a frequency converter that converts a frequency of the received signal into a baseband signal, and a delay circuit that outputs the baseband signal by applying a predetermined delay time to the baseband signal; and the second printed circuit board includes:
   a signal processing section including an object information calculating section that receives the baseband signal from the receiving section via the connector to calculate information on the object, and a control signal generating section that outputs, via the connector, a control signal to the time division section for driving the time division section, wherein the delay circuit applies the delay time to the baseband signal so that the baseband signal output from the frequency converter passes through the connector by being delayed by a predetermined time from the control signal.

2. The in-vehicle pulse radar according to claim 1, wherein the receiving section has another delay circuit that outputs the control signal to the time division section by applying another predetermined delay time to the control signal inputted from the control signal generating section via the connector.

3. The in-vehicle pulse radar according to claim 1, wherein the predetermined delay time is adjusted to make a time lag so that a time slot in which the control signal passes through the connector does not substantially overlap with a time slot in which the baseband signal passes through the connector.

4. The in-vehicle pulse radar according to claim 2, wherein at least one of the predetermined delay time and the another predetermined delay time is adjusted to make a time lag so that a time slot in which the control signal passes through the connector does not substantially overlap with a time slot in which the baseband signal passes through the connector.

5. The in-vehicle pulse radar according to any one of claims 1-3 and 4, wherein the time division section is a switching circuit that passes the received signal only during a predetermined duration in synchronism with a measured distance of the object.

6. The in-vehicle pulse radar according to any one of claims 1-3 and 4, wherein the connector is a board-to-board connector.

7. The in-vehicle pulse radar according to any one of claims 1-3 and 4, wherein the delay circuit is composed of a low-pass filter.

* * * * *

UNITED STATES PATENT AND TRADEMARK OFFICE
CERTIFICATE OF CORRECTION

PATENT NO. : 8,552,904 B2  
APPLICATION NO. : 13/611138  
DATED : October 8, 2013  
INVENTOR(S) : Kei Takahashi et al.

It is certified that error appears in the above-identified patent and that said Letters Patent is hereby corrected as shown below:

On the title page, Item (75), the 2nd Inventor's Last Name is incorrect. Item (75) should read:

--(75) Inventors: Kei Takahashi, Tokyo (JP);
                    Sadao Matsushima, Tokyo (JP);
                    Toshihide Fukuchi, Tokyo (JP)--

Signed and Sealed this
Twenty-eighth Day of January, 2014

Michelle K. Lee
*Deputy Director of the United States Patent and Trademark Office*